Figure 1:
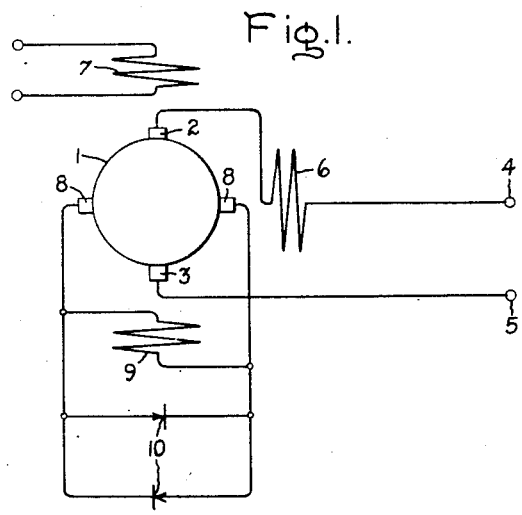

June 6, 1950 — C. A. THOMAS — 2,510,669
DYNAMOELECTRIC MACHINE WITH RESIDUAL
FIELD COMPENSATION
Filed Sept. 15, 1949

Inventor:
Charles A. Thomas:
by Ernest C Britton
His Attorney.

Patented June 6, 1950

2,510,669

UNITED STATES PATENT OFFICE 2,510,669

DYNAMOELECTRIC MACHINE WITH RESIDUAL FIELD COMPENSATION

Charles A. Thomas, Fort Wayne, Ind., assignor to General Electric Company, a corporation of New York Application September 15, 1949, Serial No. 115,907

2 Claims. (Cl. 322—79)

My invention relates to dynamoelectric machines incorporating means for eliminating field excitation which is due to residual magnetism in the field and, more particularly, to dynamoelectric machines having residual field compensating windings and associated non-linear impedance elements for rendering said windings inoperative when not required, without the use of switches.

In certain types of dynamoelectric machines, the presence of the usual residual magnetization remaining in the field poles of the machine after field excitation has been removed is undesired and troublesome. This is especially true in armature reaction excited dynamoelectric machines having compensation for secondary armature reaction and commonly known as amplidynes. By the nature of these machines, the field excitation required is only of the same order of magnitude as the residual field magnetization. If control of the machine is, therefore, to be maintained by the regular field windings, the residual field magnetism must be overcome or compensated for in some manner. This is particularly necessary in the usual applications of the amplidyne where it is used as a generator whose output voltage magnitude and polarity are required to correspond to the input voltages to one or more excitation or control windings and where the amplidyne armature is continuously rotating, the output voltage magnitude and polarity being completely determined by the control windings. The elimination of, or compensation for, the residual field in such machines has heretofore been accomplished by such elaborate expedients as applying a low alternating current voltage to a field winding of the machine. This often necessitates the use of a separate alternating current voltage generator.

It is, therefore, an object of my invention to provide a dynamoelectric machine having residual field compensation which is simple, reliable, and economical.

It is an other object of my invention to provide a residual field compensator which does not require a separate source of alternating current voltage for its operation.

In some dynamoelectric machines, it has been the previous practice to obtain residual field compensation under zero field excitation conditions by connecting a compensating field across the armature terminals of the machine by means of a separate switch or an auxiliary contact on the main switch for the machine. The provision of a separate switch or auxiliary contacts involves added expense and requires additional maintenance.

It is, therefore, another object of my invention to provide a dynamoelectric machine incorporating a residual field compensator which does not require additional switches or auxiliary contacts, but which is, nevertheless, effective during periods of zero field excitation by the control field windings and ineffective when the control windings supply excitation.

My invention, therefore, consists essentially of a dynamoelectric machine having a residual magnetization compensator which includes a compensator field winding connected in the armature circuit of the machine and associated non-linear impedance elements to render the winding ineffective when normal field excitation is supplied.

For a better understanding of this invention, reference may be had to the following description taken in connection with the accompanying drawing, and its scope will be pointed out in the appended claims.

Figure 2:
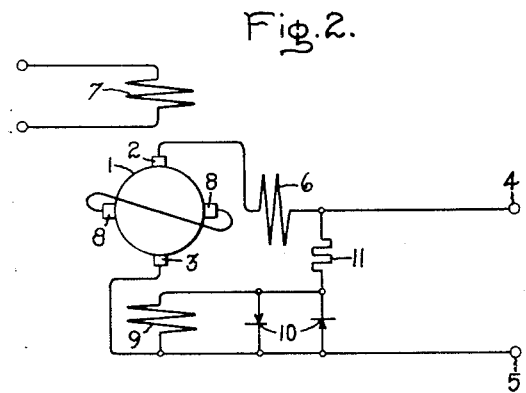

In the drawings, Fig. 1 is a schematic view of an amplidyne incorporating my invention in which the residual compensation winding is connected between the amplidyne commutator brushes which are conventionally short-circuited, and Fig. 2 is a schematic view of another embodiment of my invention in which the residual compensation winding is connected across the output terminals of a dynamoelectric machine.

Referring to Fig. 1, there is schematically shown an amplidyne 1 having armature output commutator brushes 2 and 3 connected to output terminals 4 and 5. Between brush 2 and terminal 4, as is characteristic of the amplidyne generator, a compensating field winding 6 is connected to compensate for secondary armature reaction. One or more control or field excitation windings, such as 7, may be provided. Two additional commutator brushes 8 are provided which are normally short-circuited, but in this embodiment of my invention, a residual field compensating winding 9 is connected between these brushes. Connected in parallel with winding 9 is a non-linear impedance such as reversely connected rectifiers 10. These rectifiers may be electric valves of either the vacuum or gas-filled type, or rectifiers of the dry type, such as copper oxide or copper sulfide rectifiers. I, however, prefer to use the copper sulfide rectifier, due to its ability to handle high current densities and due to the low voltage at which current conduction begins. The advantage of the latter feature will appear from the following explanation of the operation of my invention.

Residual field compensation winding 9 is connected with such a polarity that any residual field magnetization causes a current to flow between the armature brushes 8 through winding 9 to set up a magnetic field which opposes the residual magnetization. When control field winding 7 is energized, compensating winding 9 will then oppose the resulting control field winding magnetization. However, when the voltage across brushes 8 increases to the voltage value at which rectifiers 10 become conductive, the voltage across these terminals will thereafter never exceed the rectifier conduction voltage and the rectifiers thereby serve as an impedance with a fixed voltage drop. The excitation of compensating winding 9 thereby never exceeds a value corresponding to the fixed voltage drop across brushes 8, as determined by the conduction through rectifiers 10. When the control signal is removed from control field winding 7, the compensating winding 9 is again effective to oppose and eliminate the residual magnetization.

In Fig. 2, there is shown a second embodiment of my invention in which the residual elimination winding 9 and rectifiers 10 are connected in series with a current limiting resistor 11 across the output terminals 4 and 5 of the amplidyne generator. Resistor 11 prevents the current through rectifiers 10 from becoming excessive and thereby lowering the output voltage across terminals 4 and 5 when full excitation is supplied by control winding 7. Resistor 11 is preferably of a non-linear type, such as an incandescent lamp filament which has a low resistance when the voltage impressed on the resistor is low and a relatively high resistance when the impressed voltage is high. This embodiment of my invention may be incorporated in any dynamoelectric machine and is not necessarily limited to amplidynes. Resistor 11 alternatively may be connected to current collector 2 instead of output terminal 4. This connects the compensator circuit directly across current collectors 2 and 3.

It will be seen from the above that this invention provides a simple, low-cost, maintenance-free structure for the elimination of undesired residual magnetic fields in a dynamoelectric machine which is effective when it is needed, i. e., when the regular field excitation is reduced to zero, but without the use of switching means is rendered ineffective to interfere with the regular field excitation.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an amplidyne generator having at least one control winding, a residual magnetization compensation winding, direct phase current collectors and quadrature phase current collectors, said residual excitation compensation winding being connected across said quadrature phase current collectors, and a pair of reversely-connected rectifiers connected in parallel with said winding to limit the excitation voltage across said winding to a predetermined maximum value.

2. In a dynamoelectric machine having a stationary magnetic field structure, a magnetic armature adapted to rotate within said stator and including a commutator, armature current collectors associated with said commutator, a residual magnetization compensation winding and a resistor connected in series between two of said current collectors and a pair of reversely-connected rectifiers connected in parallel with said winding to limit the excitation voltage across said winding to a predetermined maximum value.

CHARLES A. THOMAS.

REFERENCES CITED

The following references are of record in the file of this patent:

UNITED STATES PATENTS

| Number | Name | Date |
|---|---|---|
| 1,855,736 | White | Apr. 26, 1932 |
| 2,151,678 | Blankenbuehler et al. | Mar. 28, 1939 |